(12) United States Patent     (10) Patent No.: US 8,644,522 B2
LeBlanc et al.     (45) Date of Patent: Feb. 4, 2014

(54) METHOD AND SYSTEM FOR MODELING EXTERNAL VOLUME CHANGES WITHIN AN ACOUSTIC ECHO CANCELLER

(75) Inventors: Wilfrid Paul LeBlanc, British Columbia (CA); Elias Nemer, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 449 days.

(21) Appl. No.: 13/076,691

(22) Filed: Mar. 31, 2011

(65) Prior Publication Data

US 2012/0250872 A1    Oct. 4, 2012

(51) Int. Cl.
    *A61F 11/06*       (2006.01)
    *G10K 11/16*       (2006.01)
    *H03B 29/00*       (2006.01)
    *H04B 15/00*       (2006.01)

(52) U.S. Cl.
    USPC ............... 381/71.12; 381/71.1; 381/71.11; 381/94.1; 381/94.2

(58) Field of Classification Search
    USPC .......... 381/71.1, 94.1, 94.8, 71.11, 71.12, 381/71.8, 58, 104, 66; 379/406.01; 370/286, 289

See application file for complete search history.

(56) References Cited

U.S. PATENT DOCUMENTS

2006/0147031 A1*   7/2006   Yeh et al. ............... 379/406.08

OTHER PUBLICATIONS

A. Stenger, L. Trautmann, and R. Rabenstein, Nonlinear Acoustic Echo Cancellation With 2nd Order Adaptive Volterra Filters, IEEE Int. Conf. on Acoustics, Speech & Signal Processing (ICASSP), Phoneix, USA, Mar. 1999 (4 pages).

* cited by examiner

*Primary Examiner* — Vivian Chin
*Assistant Examiner* — Douglas Suthers
(74) *Attorney, Agent, or Firm* — Thomas Horstemeyer, LLP

(57) ABSTRACT

A method and system are provided in which a device, such as an acoustic echo canceller, may reduce the residual echo that may be heard at the far end of a conversation when an external speaker volume is changed. The device may compute a gain based on an echo estimate produced by a filter and on a near-end signal comprising audio information. The gain may be based on a correlation of the echo estimate and the near-end signal that tracks the changes in volume. Once computed, the gain may be validated to ensure that it is being applied when appropriate. The echo estimate may be adjusted by first applying the gain to an output of the filter and subsequently scaling a value of each of the coefficients of the filter based on the gain. The gain may be smoothed out over consecutive frames based on several adaptation schemes.

20 Claims, 11 Drawing Sheets

METHOD AND SYSTEM FOR MODELING EXTERNAL VOLUME CHANGES WITHIN AN ACOUSTIC ECHO CANCELLER

CROSS-REFERENCE TO RELATED APPLICATIONS/INCORPORATION BY REFERENCE

Not Applicable.

FIELD OF THE INVENTION

Certain embodiments of the invention relate to audio processing. More specifically, certain embodiments of the invention relate to a method and system for modeling external volume changes within an acoustic echo canceller.

BACKGROUND OF THE INVENTION

An acoustic echo canceller may utilize an adaptation algorithm, such as least mean squares (LMS), for example, to adjust the coefficients of an internal filter in response to operating changes. When the volume of an external device reproducing sound from signals provided by the echo canceller changes arbitrarily, the echo canceller may lose convergence and a residual echo may be heard by a user at the far end of the conversation. There is a need to quickly remove and/or significantly reduce the residual echo that occurs in those situations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for modeling external volume changes within an acoustic echo canceller, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for modeling external volume changes within an acoustic echo canceller. Various embodiments of the invention provide for a device such as an echo canceller, which may be operable to reduce the residual echo that may be heard by a user at the far end of a conversation when the volume of an external speaker is changed arbitrarily by a near-end user. The echo canceller may be an acoustic echo canceller, a line echo canceller, or a network echo canceller, for example. The device may be operable to compute a gain based on an echo estimate produced by a filter and on a near-end signal that comprises near-end (microphone) audio information. The gain may be based on a correlation of the echo estimate and the near-end signal. The correlation may be utilized to detect and track external volume changes and/or other echo path variations. Once computed, the gain may be validated to ensure that it is being applied in appropriate situations. The echo estimate may be adjusted by first applying the gain to an output of the filter. Subsequently, the coefficients of the filter may be adjusted by scaling their values based on the gain. The gain may be smoothed out over consecutive frames or iterations by utilizing several adaptation schemes. The adjusted echo estimate and the near-end signal may be utilized to generate a signal with canceled or reduced residual echo that is to be communicated to the far-end user.

Other aspects of the invention relate to the filter in the device comprising a plurality of filters, each of which produces an echo estimate associated with a different frequency sub-band. In those instances, the gain may be computed based on the echo estimates produced by the plurality of filters and on corresponding sub-band portions of the near-end signal. The echo estimates produced by the plurality of filters may be adjusted by first applying the gain to an output of some or all of the plurality of filters, according to performance-based criteria. Subsequently, the filters may be adjusted by scaling their coefficient values based on the gain. The echo estimates of the plurality of filters and the near-end signal may be utilized to generate a signal with canceled or reduced residual echo that is to be communicated to the far-end user.

Figure 1A:
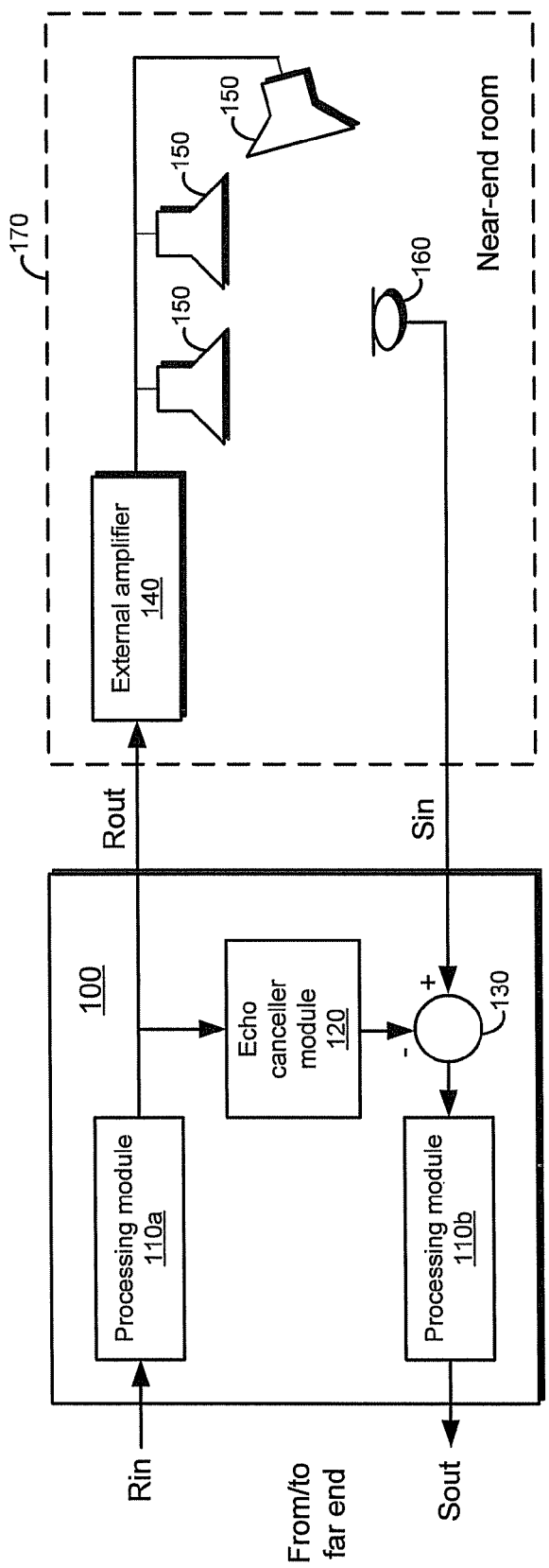
FIGS. 1A-1C are block diagrams that illustrate exemplary devices for detecting and cancelling an echo that results from external volume changes, in accordance with an embodiment of the invention.
Figure 1B:
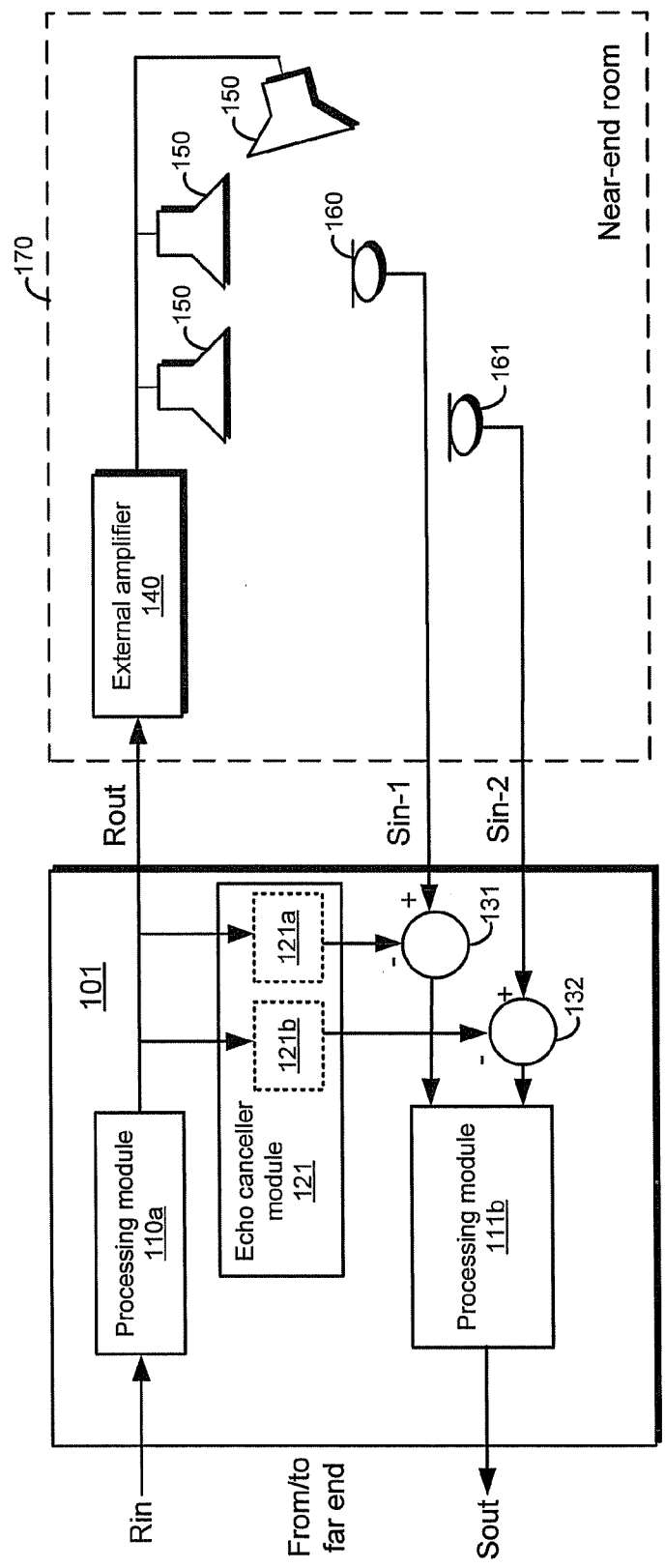
Figure 1C:
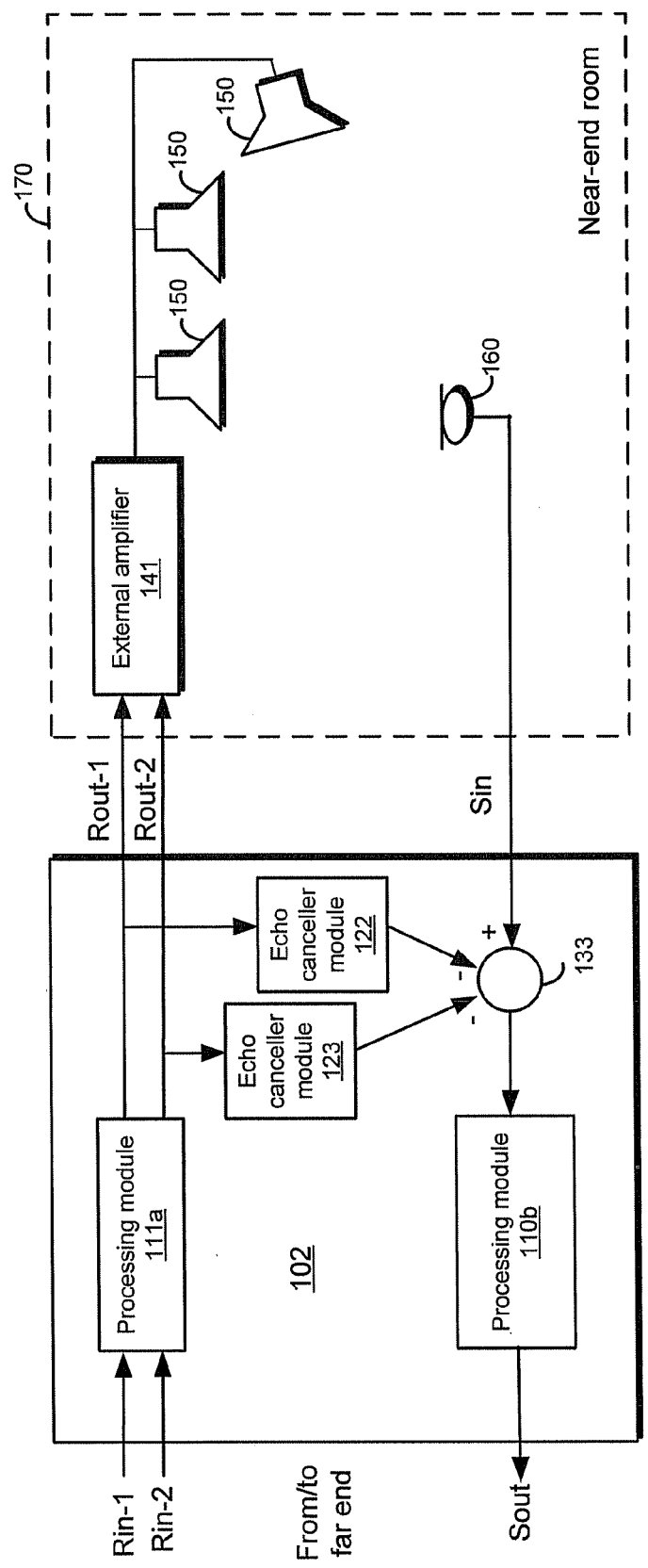

FIGS. 1A-1C are block diagrams that illustrate exemplary devices for detecting and cancelling an echo that results from external volume changes, in accordance with an embodiment of the invention. Referring to FIG. 1A, there is shown a device 100 communicatively coupled to various devices and/or modules in a near-end room 170. The device 100 may be operable to handle voice and audio communication, such as a telephone conversation, for example, between a far-end user and a local user in the near-end room 170. In one exemplary scenario, the device 100 may be part of a Voice over Internet Protocol (VoIP) desktop/conference phone. In another exemplary scenario, the device 100 may be part of a mobile device that is connected to a vehicle's audio system through a kit or by some other mean, such as an FM transmitter or a Bluetooth wireless interface, for example, to allow hands-free operation. In these scenarios, the local or near-end user is the user in the room or vehicle, while the far-end user is the user at the other end of the conversation.

The device 100 may comprise a processing module 110a, an echo canceller module 120, a subtraction module 130, and a processing module 110b. Some or all of the modules and/or components of the device 100 may be implemented in a single integrated circuit and/or may be integrated into a single substrate. Moreover, some or all of the functions of one or more modules and/or components of the device 100 may be performed by one or more of the remaining modules and/or components of the device 100.

The processing module 110a may comprise suitable logic, circuitry, code, and/or interfaces that may be operable to process a signal Rin received from the far end. The processing may comprise, but need not be limited to, formatting, decoding, filtering, signal analysis, and signal decomposition, for example. The processing module 110a may generate a signal Rout that may be communicated to the near-end room 170 and to the echo canceller module 120.

The echo canceller module 120 may comprise suitable logic, circuitry, code, and/or interfaces that may be operable to cancel or reduce a return echo to the far-end user. In this regard, the echo canceller module 120 may comprise an internal filter (not shown) and an adaptation algorithm to adjust the coefficients of the internal filter to match the changes that occur in an echo path. Changes to an echo path in the near-end room 170 may be the result of positional shifts by persons and/or devices, and/or changes in the external volume. When these shifts and/or changes occur, the adaptation algorithm starts a re-convergence process to adjust the coefficients of the internal filter to the new echo path. Until the re-convergence process is completed, which could take as long as several hundreds of milliseconds, a residual echo may result from the change in the echo path. Once re-convergence is completed and the internal filter coefficients have been adjusted, the echo canceller module 120 may generate an echo estimate from the signal Rout that may be utilized to cancel or reduce a return echo in a signal Sin that is received from the near-end room 170. The signal Sin may be referred to as a near-end signal, for example.

The echo canceller module 120 may be operable to detect, track, model and/or compensate for changes in the echo path that result from, for example, changes in an external volume. In this regard, the echo canceller module 120 may be operable to cancel or reduce the echo resulting from external volume changes by computing a gain based on an echo estimate produced by the internal filter and on the signal Sin. The gain may be based on a correlation of the echo estimate and the signal Sin. Once computed, the gain may be validated to ensure that it is applied in the appropriate situations. The gain may then be utilized to scale an output of the internal filter and/or the coefficients of the internal filter to cancel or reduce the echo that may otherwise result from the external volume changes. The reduction of the echo may comprise reducing one or both of the level and the duration of the echo.

By computing a gain and applying such gain to the output of the internal filter and/or the coefficients of the internal filter, the echo canceller module 120 may be able to cancel or reduce the echo faster than it would typically occur through the adaptation algorithm re-convergence process. Such fast response, which may be in the tens of milliseconds rather than in the hundreds of milliseconds, need not result in an unstable operation of the echo canceller module 120.

The operations associated with detection, tracking, modeling, and/or compensation of external volume changes by the echo canceller module 120 may be enabled or disabled during operation. When enabled, it may run continuously to appropriately compensate for any changes in external volume. Moreover, there may be a default mode in which the echo canceller module 120 may be initially enabled or disabled when starting up the device 100 and may remain in that mode unless it is changed by a user. The user may be made aware of whether the echo canceller module 120 is enabled to handle changes in the external volume by being provided with a visual indication, such as having a light emitting diode (LED) turned ON, for example. Similarly, when the LED is turned OFF, the user may understand that the operations associated with external volume changes in the echo canceller module 120 are disabled. In an embodiment of the invention, the operations associated with external volume changes in the echo canceller module 120 may always be enabled.

The subtraction module 130 may comprise suitable logic, circuitry, code, and/or interfaces that may be operable to subtract an echo estimate produced by the echo canceller module 120 from the signal Sin. The output from the subtraction module 130 may be provided to the processing module 110b.

The processing module 110b may comprise suitable logic, circuitry, code, and/or interfaces that may be operable to process the output from the subtraction module 130. The processing may comprise, but need not be limited to, formatting, coding, filtering, signal analysis, and signal synthesis, for example. The processing module 110b may generate a signal Sout that may be communicated to the far-end user.

In the near-end room 170 there is shown an external amplifier 140, a plurality of speakers 150, and a microphone 160. The number of devices and/or components shown in the near-end room 170 is intended for purposes of illustration and not of limitation. Fewer or more of the devices and/or components shown in the near-end room 170 may be utilized.

The external amplifier 140 may comprise suitable logic, circuitry, code, and/or interfaces that may be operable to receive and process the signal Rout from the device 100. The processing may comprise amplification of the signal Rout. The processing may also comprise, but need not be limited to, filtering, signal analysis, and signal decomposition and/or synthesis, for example. An output from the external amplifier 140 may be communicated to the speakers 150 to reproduce a sound associated with the audio information comprised in the amplified signal. The external amplifier 140 may be operable to allow a user in the near-end room 170 to adjust or vary the volume or loudness of the sound to be reproduced by the speakers 150. The volume may be increased or decreased arbitrarily based on, for example, the conditions in the near-end room 170, the clarity or the current level of the sound reproduced by the plurality of speakers 150, and/or the preference of one or more near-end users.

The microphone 160 may be operable to capture sound, such a speech from one or more near-end users, for example, and to convert the captured sound into the signal Sin. The microphone 160 may also capture the sound reproduced by the speakers 150, which may show as an echo component in the signal Sin.

In some embodiments of the invention, one or more of the external amplifier 140, the plurality of speakers 150, and the microphone 160 may be part of a device, such as a VoIP desktop/conference phone or a mobile phone, for example, which may also comprise the device 100.

In operation, the processing module 110a may process the signal Rin from the far end to generate the signal Rout. The signal Rout may be communicated to the external amplifier 140 for amplification. The amplified signal may then be communicated to the speakers 150 to reproduce the sound associated with the audio information comprised in the amplified signal. The signal Rout may also be communicated to the echo canceller module 120 to generate an estimate of the echo that may appear in the signal Sin from reflections or coupling between the plurality of speakers 150 and the microphone 160. The echo estimate may be subtracted from the signal Sin by the subtraction module 130 and the result may be provided to the processing module 110b. The signal Sout generated by the processing module 110b may be communicated to the far end where the sound associated with the audio information in that signal may be reproduced for the far-end user to hear.

When a user in the near-end room 170 increases or decreases the volume in the external amplifier 140, and thus in the sound reproduced by the plurality of speakers 150, the echo canceller module 120 may detect, track, model, and/or compensate for those external volume changes by computing a gain that may be applied to the output of an internal filter and/or to the value of the coefficients of that filter. In this manner, the echo canceller module 120 may generate a more appropriate echo estimate to quickly and in a stable way eliminate or reduce an echo that would otherwise appear in the signal Sout as a result of volume changes in the sound reproduced by the plurality of speakers 150.

Referring to FIG. 1B, there is shown a device 101 that may comprise the processing module 110, a processing module 111b, an echo canceller module 121, and subtraction modules 131 and 132. The near-end room 170 may comprise an additional microphone, microphone 161.

The echo canceller module 121 in the device 101 may be substantially similar to the echo canceller module 120 described above with respect to FIG. 1A. The echo canceller module 121 may comprise a first filter 121a and a second filter 121b. The echo canceller module 121 may be operable to produce an echo estimate associated with a first near-end signal Sin-1 by filtering signal Rout with the first filter 121a. The echo canceller module 121 may be operable to produce another echo estimate, this time associated with a second near-end signal Sin-2, by filtering signal Rout with the second filter 121b. The signal Sin-1 may be produced by the microphone 160 while the signal Sin-2 may be produced by the microphone 161. The echo canceller module 121 may be operable to adjust each or both of the echo estimates in a manner similar to that described above for the echo canceller module 120.

The subtraction modules 131 and 132 may be substantially similar to the subtraction module 130 described above. The subtraction module 131 may be operable to subtract the echo estimate produced by the first filter 121a from the signal Sin-1. The subtraction module 132 may be operable to subtract the echo estimate produced by the second filter 121b from the signal Sin-2. The output from the subtraction modules 131 and 132 may be provided to the processing module 111b.

The processing module 111b may be substantially similar to the processing module 110b described above. The processing module 111b may be operable to handle multiple processed near-end signals, such as the outputs from the subtraction modules 131 and 132, to generate the signal Sout for communication to the far-end user.

Referring to FIG. 1C, there is shown a device 102 that may comprise a processing module 111a, the processing module 110b, echo canceller modules 122 and 123, a subtraction module 133. The near-end room 170 may comprise a different external amplifier, external amplifier 141, which is operable to handle two or more signals from the processing module 111a.

The processing module 111a may be substantially similar to the processing module 110a described above with respect to FIG. 1A. The processing module 111a may be operable to receive from the far end two or more signals, such as signals Rin-1 and Rin-2. The signals Rin-1 and Rin-2 may be associated with stereophonic sound reproduction, for example. In some instances, each of the signals Rin-1 and Rin-2 may be associated with an independent audio channel. The processing module 111a may be operable to generate signals Rout-1 and Rout-2 from the signals Rin-1 and Rin-2. The signals Rout-1 and Rout-2 may be communicated to the echo canceller modules 122 and 123, respectively, and to the external amplifier 141 in the near-end room 170.

The echo canceller modules 122 and 123 may be substantially similar to the echo canceller module 120 described above. The echo canceller module 123 may be operable to generate a first component of an echo estimate of the signal Sin based on the signal Rout-1. Similarly, the echo canceller module 122 may be operable to generate a second component of the echo estimate of the signal Sin based on the signal Rout-2. The echo canceller modules 122 and 123 may be operable to adjust each or both of the components of the echo estimate in a manner similar to that described above for the echo canceller module 120.

The subtraction module 133 may be substantially similar to the subtraction module 130 described above. The subtraction module 133 may be operable to subtract the various components of the echo estimate generated by the echo canceller modules 122 and 123 from the near-end signal Sin generated by the microphone 160. The output from the subtraction module 133 may be provided to the processing module 110b to generate the signal Sout for communication to the far-end user.

Figure 2A:
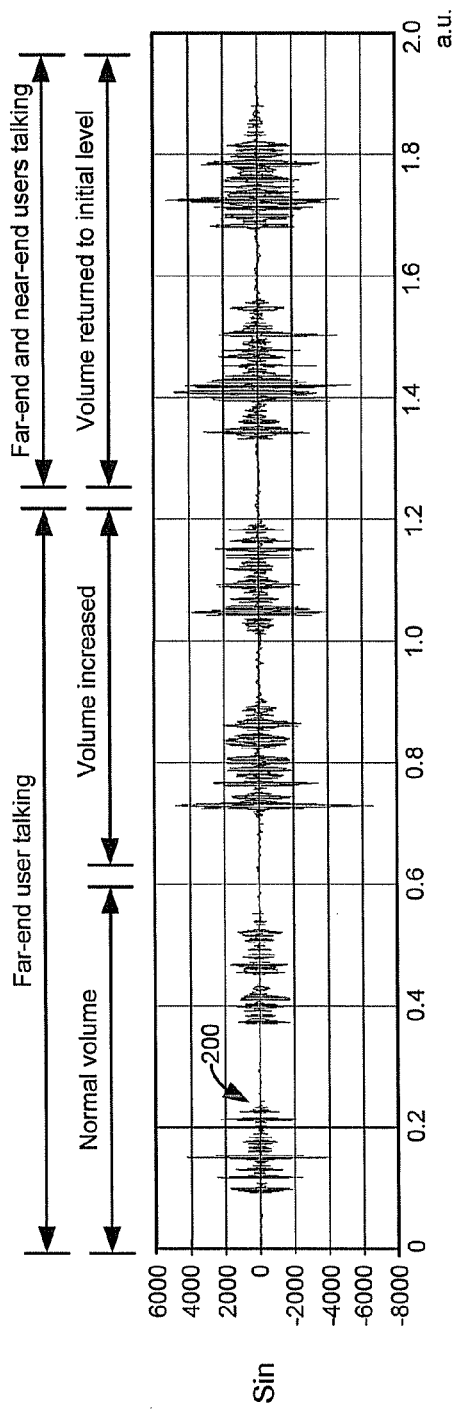
FIGS. 2A and 2B are diagrams that illustrate exemplary sound signals produced when an external volume changes, in accordance with an embodiment of the invention.
Figure 2B:
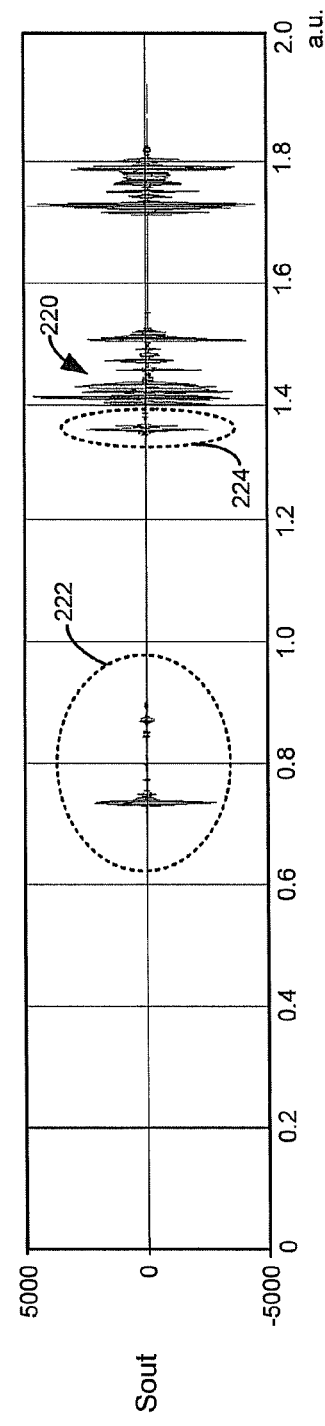

FIGS. 2A and 2B are diagrams that illustrate exemplary sound signals produced when an external volume changes, in accordance with an embodiment of the invention. Referring to FIG. 2A, there is shown a sound signal 200 that corresponds to the signal Sin provided by the microphone 160 to the device 100. A first portion of the sound signal 200, between 0 and about 1.2 in the time (horizontal) axis, corresponds to a portion of a conversation between a far-end user and user in the near-end room 170 in which only the far-end user is talking. Between 0 and about 0.6 in the time axis, the external volume, such as the volume of the external amplifier 140 in FIG. 1, for example, may be held at a normal or typical level. Between about 0.6 and about 1.2 in the time axis, the external volume may be increased by a factor of 2.

A second portion of the sound signal 200, between about 1.2 and about 2.0 in the time axis, corresponds to a portion of the conversation between the far-end user and the user in the near-end room 170 in which both users are talking. In this portion of the sound signal 200, the external volume may be decreased by a factor of 2, that is, the external volume may be decreased back to the normal or typical level previously held.

Referring to FIG. 2B, there is shown a sound signal 220 that corresponds to the signal Sout generated by the device 100 and communicated to the far-end user. In this scenario, the operations associated with the detection, tracking, modeling, and/or compensation for changes in external volume may be disabled in the echo canceller module 120. Accordingly, a residual echo 222 is present in the signal Sout after the external volume is increased and a residual echo 224 is present in the signal Sout after the external volume is decreased. When the operations associated with the detection, tracking, modeling, and/or compensation for changes in external volume are enabled, the residual echo 222 and the residual echo 224 may be canceled or significantly reduced such that neither may be noticeable to the far-end user.

Figure 3:
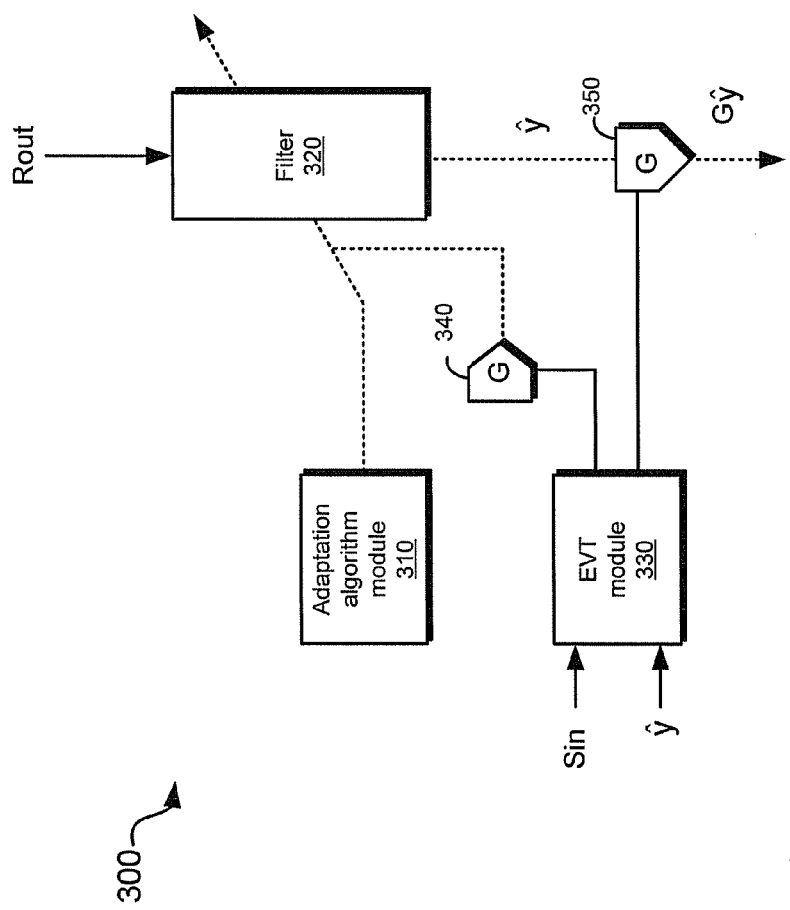
FIG. 3 is a diagram that illustrates an exemplary echo canceller with an external volume tracker, in accordance with an embodiment of the invention.

FIG. 3 is a diagram that illustrates an exemplary echo canceller with an external volume tracker, in accordance with an embodiment of the invention. Referring to FIG. 3, there is shown an echo canceller 300 that may comprise an adaptation algorithm module 310, a filter 320, an external volume tracker (EVT) module 330, and multipliers 340 and 350. The echo canceller 300 may be a linear acoustic echo canceller. In some embodiments of the invention, the EVT module 330 may be implemented separately from the other modules and/or components of the echo canceller 300.

The adaptation algorithm module 310 may comprise suitable logic, circuitry, code, and/or interfaces that may be operable to adjust the values of the coefficients utilized by the filter 320 in response to changes in the echo path. In this regard, the adaptation algorithm module 310 may start a re-convergence process to determine a new set of coefficient values when a change in the echo path is detected. The adaptation algorithm module 310 may be operable to perform an adaptation scheme based on a least mean squares (LMS) algorithm, a root mean squares (RMS) algorithm, and/or on another like algorithm.

The EVT module 330 may comprise suitable logic, circuitry, code, and/or interfaces that may be operable to detect, track, model and/or compensate for changes in the echo path that result from, for example, changes in an external volume. In this regard, the EVT module 330 may be operable to compute a gain G that is based on an echo estimate $\hat{y}$ produced by the filter 320 and on the near end signal Sin. The gain G may be a complex-valued gain, at least in those instances where the filter 320 is operating on complex-valued samples.

The EVT module 330 may be operable to validate the gain G and to determine when and how to apply the gain G to the output of the filter 320, that is, to the echo estimate $\hat{y}$, and/or to the values of the coefficients utilized by the filter 320. As illustrated in FIG. 3, the application of the gain G to the output of the filter 320 may be done independently from the application of the gain G to the values of the coefficients of the filter 320.

The optimal gain G to be applied by the EVT module 330 may be determined by minimizing the mean square error (MSE) at the output of the echo canceller 300, $MSE_{Gopt}$, may be given by the following expression:

$$MSE_{Gopt} = E[|y - G_{opt}\hat{y}|^2] = E[(y - G_{opt}\hat{y})(y - G_{opt}\hat{y})^*], \quad (1)$$

where $G_{opt}$ is the optimal gain, $\hat{y}$ is the echo estimate produced by the filter 320, and y is the near-end signal Sin.

The value of $G_{opt}$, which may be a complex value, may be found by setting the partial derivatives for the real and imaginary components to zero as follows:

$$\frac{\partial MSE_{Gopt}}{\partial G_r} = 0, \quad (2a)$$

$$\frac{\partial MSE_{Gopt}}{\partial G_i} = 0, \quad (2b)$$

where $G_r$ is the real component and $G_i$ is the imaginary component.

Next, equation (1) above may be rewritten as follows:

$$MSE_{Gopt} = E[(y - G_{opt}\hat{y})(y^* - G_{opt}^*\hat{y}^*)] \quad (3)$$
$$= E[yy^* - G_{opt}\hat{y}y^* - G_{opt}^*y\hat{y}^* + |G_{opt}|^2 \hat{y}\hat{y}^*]$$
$$= E[yy^* - (G_r + jG_i)\hat{y}y^* - (G_r - jG_i)y\hat{y}^* + (G_r^2 + G_i^2)\hat{y}\hat{y}^*],$$

such that the partial derivatives with respect to the real and imaginary components of the gain may be given by the following expressions:

$$\frac{\partial MSE_{Gopt}}{\partial G_r} = E[-\hat{y}y^* - y\hat{y}^*] + 2G_r E[\hat{y}\hat{y}^*] \quad (4a)$$
$$= E[-(y\hat{y}^*)^* - y\hat{y}^*] + 2G_r E[\hat{y}\hat{y}^*]$$
$$= -2E[\text{Re}\{y\hat{y}^*\}] + 2G_r E[\hat{y}\hat{y}^*], \text{ and}$$

$$\frac{\partial MSE}{\partial G_i} = E[-j\hat{y}y^* + jy\hat{y}^*] + 2G_r E[\hat{y}\hat{y}^*] \quad (4b)$$
$$= j \cdot 2jE[\text{Im}\{y\hat{y}^*\}] + 2G_i E[\hat{y}\hat{y}^*]$$
$$= -2E[\text{Im}\{y\hat{y}^*\}] + 2G_r E[\hat{y}\hat{y}^*].$$

Consequently, by setting the partial derivatives in equations (4a) and (4b) to zero, the real and imaginary components of the optimal gain may be obtained as illustrated by the expressions below:

$$\frac{\partial MSE_{Gopt}}{\partial G_r} = 0 \Rightarrow G_{real} = \frac{E[\text{Re}\{y\hat{y}^*\}]}{E[\hat{y}\hat{y}^*]}, \quad (5a)$$

$$\frac{\partial MSE_{Gopt}}{\partial G_i} = 0 \Rightarrow G_i = \frac{E[\text{Im}\{y\hat{y}^*\}]}{E[\hat{y}\hat{y}^*]}. \quad (5b)$$

Adding the results from equations (5a) and (5b), the optimal gain may be given by the following expression:

$$G = \frac{E[\hat{y}^* \cdot y]}{E[||\hat{y}||^2]}. \quad (6)$$

The filter 320 may comprise suitable logic, circuitry, code, and/or interfaces that may be operable to perform adaptive filtering of the signal Rout. The filter 320 may comprise a plurality of taps or filter coefficients that may be adjusted or changed by the adaptation algorithm module 310. The filter 320 may be a linear filter but need not be so limited. The filter 320 may be a non-linear type filter, such as but not limited to Volterra filters. Examples of types of non-linear filters that may be utilized for echo cancellation are illustrated in "Non-linear Acoustic Echo Cancellation With 2nd Order Adaptive Volterra Filter," by A. Strenger et al., in Proceedings of the 1999 IEEE International Conference On Acoustics, Speech and Signal Processing (ICASSP-99). According to the type of filter used for echo cancellation, the adaptation algorithm utilized by the adaptation algorithm module 310 may be suitable to adjust the coefficients of the specific type of filter that is used.

The multiplier 340 may comprise suitable logic, circuitry, code, and/or interfaces that may be operable to scale the values of the coefficients utilized by the filter 320. The gain G that is applied by the multiplier 340 may be provided by the EVT module 330. The multiplier 350 may comprise suitable logic, circuitry, code, and/or interfaces that may be operable to scale the output of the filter 320, that is, the echo estimate $\hat{y}$, to produce a scaled output $G\hat{y}$. The gain G that is applied by the multiplier 350 may be provided by the EVT module 330. Both the multiplier 340 and the multiplier 350 may be operable to apply a complex-valued gain.

The gains of the multipliers 340 and 350 may be unity (G=1) until the EVT module 330 instructs the multipliers 340 and/or 350 that a new gain is to be applied. In some embodiments of the invention, the functionality of the multipliers 340 and/or 350 may be provided by the EVT module 330. That is, the EVT module 330 may be operable to scale the values of the coefficients utilized by the filter 320 and/or to scale the output of the filter 320.

In operation, the EVT module 330 may detect a change in the echo path that may have resulted from changes in the external volume. The EVT module 330 may compute the gain G by correlating the echo estimate $\hat{y}$ and the near-end signal Sin. The correlation operation may also be utilized to perform the initial detection of an echo path change. The EVT module 330 may validate the gain G before scaling the values of the coefficients utilized by the filter 320 and/or the output of the filter 320 through the multipliers 340 and 350, respectively. Moreover, the EVT module 330 may determine when and how such scaling is to take place.

As noted above, the gain G computed by the EVT module 330 may be a complex-valued gain. The EVT module 330 may compute the gain G during various frames or iterations of the echo canceller 300, generally in a continuous manner. A frame or iteration may range from about 5 milliseconds (msec) to about 20 msec, with 10 msec being typical. The frame or iteration rate of the echo canceller 300 may be based on whether the echo canceller 300 is locked to the speed of operation of a speech coder (not shown). To reduce any possible abrupt changes that may occur in the computed gain G, the EVT module 330 may smooth out the results of each iteration based on previously computed gain values.

A first smoothing scheme that may be utilized by the EVT module 330 is a running average scheme that utilizes an adaptation parameter $\alpha$. Below are shown exemplary expressions for determining the complex components of the gain G for a current iteration when an adaptation parameter $\alpha$ is utilized:

$$G_r(n)=[1-\alpha]\cdot G_r(n-1)+\alpha\cdot G_{r0}, \quad (7)$$

$$G_i(n)=[1-\alpha]\cdot G_i(n-1)+\alpha\cdot G_{i0}, \quad (8)$$

where $G_r(n)$ is the real component of the gain to be utilized for the current iteration, $G_i(n)$ is the imaginary component of the gain to be utilized for the current iteration, $G_r(n-1)$ is the real component of the gain utilized for the previous iteration, $G_i(n-1)$ is the imaginary component of the gain utilized for the previous iteration, $G_{r0}$ is the real component of the gain computed for the current iteration, and $G_{i0}$ is the imaginary component of the gain computed for the current iteration.

A second smoothing scheme that may be utilized by the EVT module 330 is a gradient-based adaptation scheme that utilized an adaptation parameter $\mu$. Below are shown exemplary expressions for determining the complex components of the gain G for a current iteration when an adaptation parameter $\mu$ is utilized:

$$G_r(n)=G_r(n-1)+\mu\cdot\Delta_r, \quad (9)$$

$$G_i(n)=G_i(n-1)+\mu\cdot\Delta_i, \quad (10)$$

where $G_r(n)$, $G_i(n)$, $G_r(n-1)$, and $G_i(n-1)$ are as described above, and $\Delta_r$ and $\Delta_i$ are the real and imaginary full-band gradients, respectively. The real and imaginary full-band gradients are the derivatives of the MSE with respect to the real and imaginary components of the gain, respectively. In this regard, the real full-band gradient may be obtained as follows:

$$\Delta_r = \frac{\partial MSE_{G_{opt}}}{\partial G_r} = 2G_r E[\hat{y}\hat{y}^*] - 2E[\text{Re}\{y\hat{y}^*\}], \text{ and} \quad (11)$$

$$\Delta_r = G_{r0}\cdot E[\hat{y}\hat{y}^*] - E[\text{Re}\{y\hat{y}^*\}], \quad (12)$$

where $G_{r0}$ is as described above, $\hat{y}$ is the echo estimate, and y is the near-end signal Sin. On the other hand, the imaginary full-band gradient may be obtained as follows:

$$\Delta_i = \frac{\partial MSE_{G_{opt}}}{\partial G_i} = 2G_i E[\hat{y}\hat{y}^*] - 2E[\text{Im}\{y\hat{y}^*\}], \text{ and} \quad (13)$$

$$\Delta_i = G_{i0}\cdot E[\hat{y}\hat{y}^*] - E[\text{Im}\{y\hat{y}^*\}], \quad (14)$$

where $G_{i0}$ is as described above, and again $\hat{y}$ is the echo estimate and y is the near-end signal Sin. In equation (12), the real component of the cross-correlation is subtracted from the product of $G_{r0}$ and the energy of the echo estimate. In equation (14), the imaginary component of the cross-correlation is subtracted from the product of $G_{i0}$ and the energy of the echo estimate.

For the second smoothing scheme, the step size of the adaptation parameter $\mu$ may be a fixed, power of two (2), step size that may result in a cost-effective implementation. The step size may also be variable and a function of the norm of the error, that is, the full-band mean square error (MSE), to speed up the scheme when appropriate. Below are shown exemplary expressions for the types of step size that may be utilized with the adaptation parameter $\mu$:

$$\mu = \frac{1}{2^\alpha}, \quad (15)$$

$$\mu = \frac{2^{\log_2(full\_band\ mse)/\beta}}{2^\alpha}, \quad (16)$$

where $\beta$ is another adaptation parameter, and the parameter $\alpha$ in equations (15) and (16) may be the same or may be different from the adaptation parameter $\alpha$ described above with respect to equations (7) and (8).

A third smoothing scheme that may be utilized by the EVT module 330 may comprise the use of a longer time interval in the computation of the correlation and the energy used in equation (6). For instance, the correlation and energy computations may be carried over a length of time of 100 msec, or over 10 iterations of 10 msec each. In order to emphasize the more recent values in the computations, a non-uniform weighting function may be applied such as, for example, an exponential window function that de-emphasizes older values and may give more weight to more recent ones.

Figure 4:
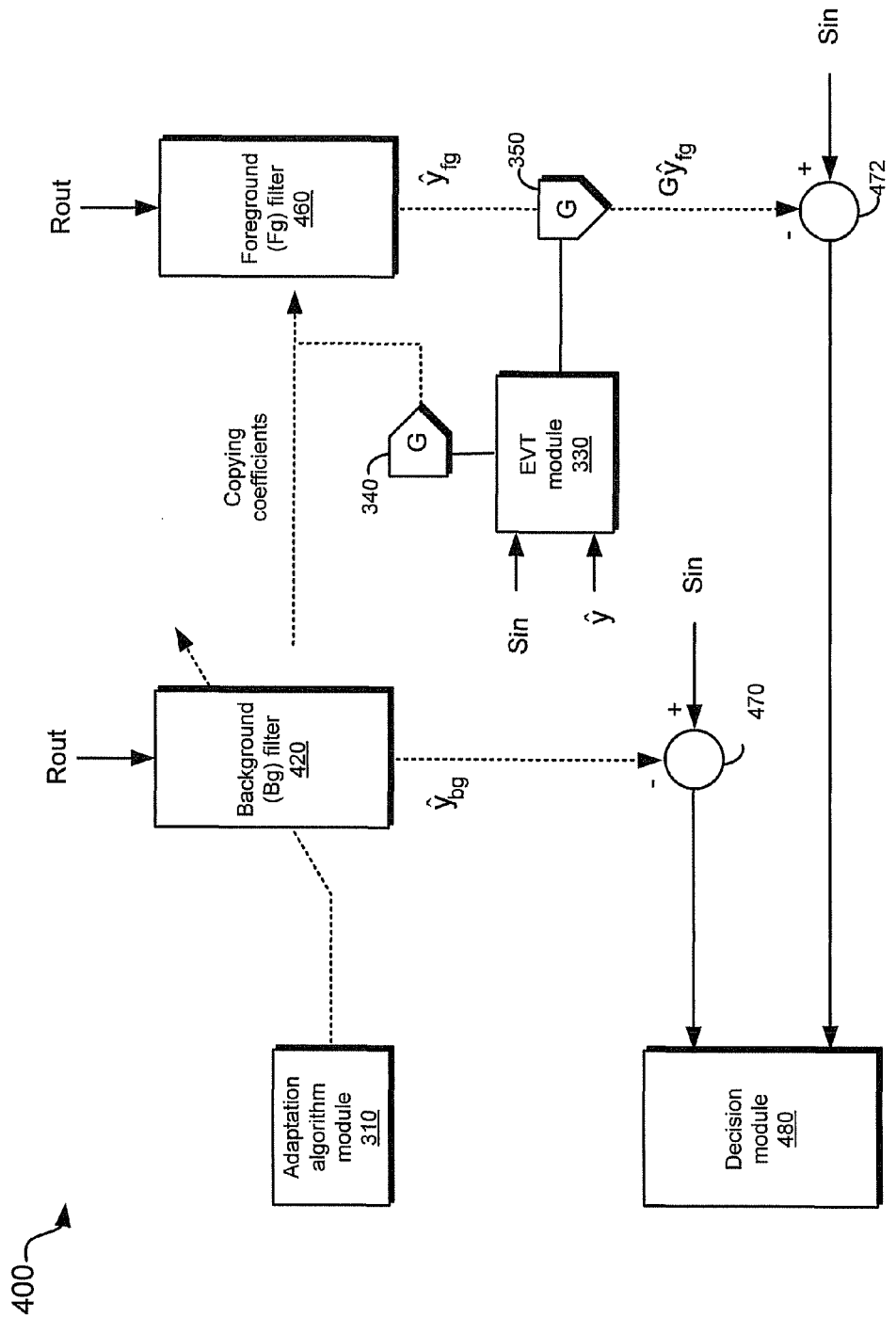
FIG. 4 is a diagram that illustrates an exemplary two-path echo canceller with an external volume tracker, in accordance with an embodiment of the invention.

FIG. 4 is a diagram that illustrates an exemplary two-path echo canceller with an external volume tracker, in accordance with an embodiment of the invention.

Referring to FIG. 4, there is shown a two-path echo canceller 400 that may be operable to handle double-talk and/or echo path changes associated with echo cancellation. The two-path echo canceller 400 may comprise a background (Bg) filter 420 and a foreground (Fg) filter 460. The Bg filter 420 may be operable to adapt its coefficients to the changing echo paths in a manner similar to that described above with respect to the filter 320 in FIG. 3. The Fg filter 460, which may also predict or estimate the resulting echo component in the near-end signal Sin, may receive its coefficients from the Bg filter 420 when the Bg filter 420 is determined to be performing better than the Fg filter 460 according to some performance measure. There may be various techniques utilized to copy the coefficient values from the Bg filter 420 to the Fg filter 460. These techniques may comprise various measures that assess and compare the convergence of the two filters.

Returning to FIG. 4, the two-path echo canceller 400 may comprise the adaptation algorithm module 310, the EVT module 330, and the multipliers 340 and 350, described above with respect to FIG. 3. The two-path echo canceller 400 may also comprise the Bg filter 420 and the Fg filter 460 described above, as well as a subtraction module 470, a subtraction module 472, and a decision module 480. The two-path echo canceller 400 may be an acoustic echo canceller, a line echo canceller, or a network echo canceller. In some embodiments of the invention, one or more of the EVT module 330, the decision module 480, and the subtraction modules 470 and 472 may be implemented separately from the other modules and/or components of the two-path echo canceller 400.

The Bg filter 420 may comprise suitable logic, circuitry, code, and/or interfaces that may be operable to perform adaptive filtering of the signal Rout. The Bg filter 420 may comprise a plurality of taps or filter coefficients that may be adjusted or changed by the adaptation algorithm module 310. The subtraction module 470 may comprise suitable logic, circuitry, code, and/or interfaces that may be operable to subtract the output $\hat{y}_{bg}$ produced by the filter from the near-end signal Sin. The output from the subtraction module 470 may be provided to the decision module 480.

The Fg filter 460 may comprise suitable logic, circuitry, code, and/or interfaces that may be operable to perform filtering of the signal Rout to produce an echo estimate $\hat{y}_{fg}$. The Fg filter 460 may comprise a plurality of taps or filter coefficients, the values of those coefficients may be provided from the Bg filter 420 when it is determined that the performance of the Bg filter 420 is better than the performance of the Fg filter 460 according to a given performance measure.

The EVT module 330 may be operable to compute a gain G. The gain G may be provided to the multiplier 340 to scale the values of the coefficients utilized by the Fg filter 460. The gain G may also be provided to the multiplier 350, which may be operable to utilize the gain G to scale the output of the Fg filter 460, that is, the echo estimate $\hat{y}_{fg}$, to produce a scaled output $G\hat{y}_{fg}$. Both the multiplier 340 and the multiplier 350 may be operable to apply a complex-valued gain.

The subtraction module 472 may comprise suitable logic, circuitry, code, and/or interfaces that may be operable to subtract the scaled output $G\hat{y}_{fg}$ produced by the multiplier 350 from the near-end signal Sin. The output from the subtraction module 472, along with the output from the subtraction module 470, may be provided to the decision module 480.

The decision module 480 may comprise suitable logic, circuitry, code, and/or interfaces that may be operable to determine which output from the subtraction module 470 and from subtraction module 472 is performing better. When the output from the subtraction module 470 is performing better, according to a performance-based criteria, the decision module 480 may determine to copy the coefficient values from the Bg filter 420 to the Fg filter 460. The copying may take place after the coefficient values have converged and are stable. Otherwise, when the output from the subtraction module 472 is performing better, the decision module 480 may determine to keep the current coefficient values that are being utilized by the Fg filter 460.

In operation, the adaptation algorithm module 310 and/or the EVT module 330 may adjust the values of the coefficients utilized by the Bg filter 420 and/or may scale the values of the coefficients and/or the output of the Fg filter 460 in response to changes in the external volume. When the decision module 480 determines that the Bg filter 420 is producing a better echo estimate than the Fg filter 460, the decision module 480 may provide instructions to the have the values of the coefficients utilized by the Bg filter 420 be copied to the Fg filter 460 after those values have converged and are stable. When the decision module 480 determines that the Fg filter 460 is producing a better echo estimate than the Bg filter 420, the decision module 480 may provide instructions that the current coefficient values utilized by the Fg filter 460 are not to be changed.

The Bg filter 420 and the Fg filter 460 need not be to linear filters, but may be implemented using non-linear type filters, such as Volterra filters or other non-linear configurations, for example. Therefore the adaptation algorithm utilized by the adaptation algorithm module 310 may be one that is suitable to adjust the coefficients of the specific type of filter that is being used for echo cancellation.

In another embodiment of the invention, the EVT module 330 and the multipliers 340 and 350 may instead be utilized to scale the values of the coefficients and/or the output of the Bg filter 420. When the decision module 480 determines that the echo estimate produced by the Bg filter 420 is performing better than the echo estimate produced by the Fg filter 460, the decision module 480 may provide instructions to the have the values of the coefficients utilized by the Bg filter 420 be copied to the Fg filter 460.

Other techniques may be combined with the operations of the various echo cancellers described herein to improve acoustic, line, or network echo cancellation. For example, a non-linear processor (NLP) may be utilized to remove at least a portion of a residual echo. The NLP is typically combined with comfort noise injection to perceptually match the background noise at the near end. A variety of methods can be used to implement the NLP, one of which may be based on a center clipper with dynamic thresholds. Other approaches may also be used to implement a NLP, as persons skilled in the art would appreciate. In another example, a variable step size adaptation may be utilized for adjusting the coefficient values by the adaptation algorithm module 310, for example. The choice of step size may be based on the trade-off between steady-state error and the speed of adaptation. When the residual error that would result is large, the step size may be adjusted so that the adaptation process will speed up. When the residual error that would result is small, the step size may be adjusted so that the adaptation process slows down.

Figure 5:
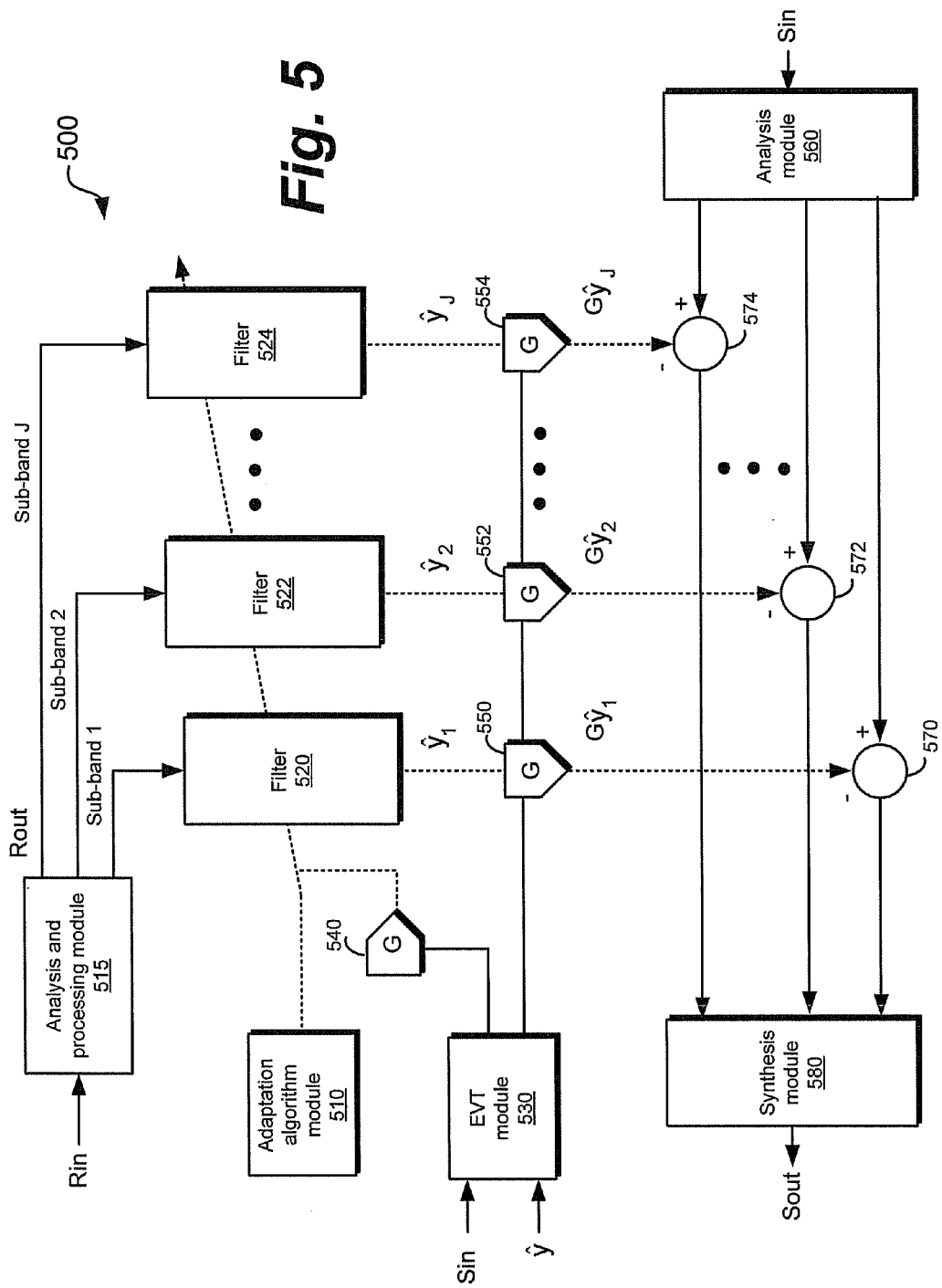
FIG. 5 is a diagram that illustrates an exemplary echo canceller with a sub-band architecture and an external volume tracker, in accordance with an embodiment of the invention.

FIG. 5 is a diagram that illustrates an exemplary echo canceller with a sub-band architecture and an external volume tracker, in accordance with an embodiment of the invention. Referring to FIG. 5, there is shown an echo canceller 500 that may comprise an adaptation algorithm module 510, filters 520, 522, . . . , and 524, an EVT module 530, multipliers 540 and 550, 552, . . . , and 554, and subtraction modules 570, 572, . . . , and 574. The echo canceller 500 may also comprise an analysis and processing module 515, an analysis module 560, and a synthesis module 580. The echo canceller 500 may be an acoustic echo canceller, a line echo canceller, or a network echo canceller. In some embodiments of the invention, one or more of the analysis and processing module 515, the analysis module 560, the synthesis module 580, and the EVT module 530 may be implemented separately from the other modules and/or components of the echo canceller 500.

The echo canceller 500 may comprise a sub-band architecture in which the echo estimation and cancellation may be performed through concurrent analysis of different frequency sub-bands. Associated with each frequency sub-band is one of the filters 520, 522, ..., and 524. Each of these filters receives a corresponding sub-band portion of the signal Rout, generates an echo estimate, and may have its coefficients and/or echo estimate scaled based on a gain G generated by the EVT module 530. In the exemplary architecture shown in FIG. 5, the echo canceller 500 may be operable to handle J different frequency sub-bands, and thus, may utilize J filters.

The analysis and processing module 515 may comprise suitable logic, circuitry, code, and/or interfaces that may be operable to receive the signal Rin and produce the signal Rout as a combination of J separate sub-band portions, each of which is provided as input to a different filter from the filters 520, 522, ..., and 524.

The adaptation algorithm module 510 may comprise suitable logic, circuitry, code, and/or interfaces that may be operable to adjust the values of the coefficients utilized by the filters 520, 522, ..., and 524 in response to changes in the echo path. In this regard, the adaptation algorithm module 510 may be similar to the adaptation algorithm module 310 described above.

The EVT module 530 may comprise suitable logic, circuitry, code, and/or interfaces that may be operable to detect, track, model and/or compensate for changes in the echo path that result from, for example, changes in an external volume. In this regard, the EVT module 530 may be operable to compute a gain G that is based on the signal Sin and on the echo estimates $\hat{y}_1, \hat{y}_2, \ldots,$ and $\hat{y}_J$ produced by the filters 520, 522, ..., and 524, respectively. The gain G may be a complex-valued gain.

The EVT module 530 may be operable to validate the gain G and to determine when and how to apply the gain G to the output of the filters 520, 522, ..., and 524, and/or to the values of the coefficients utilized by the filters 520, 522, ..., and 524. In some embodiments of the invention, according to a performance-based criteria, the gain G may be applied to the output of some or all of the filters 520, 522, ..., and 524, and/or to the values of the coefficients utilized by some or all of the filters 520, 522, ..., and 524.

The gain G may be based on a correlation of the echo estimates and the near-end signal Sin taken across all the sub-bands. In a sub-band architecture having multiple sub-bands, the gain may be obtained by minimizing the total MSE across all the sub-bands. For purposes of illustration, below is an example in which 2 sub-bands and a real-valued gain are used in a sub-band architecture. In such an instance, the MSE may be given by the following expression:

$$\text{MSE}_{Fullband\_Gopt} = E[|y_1 - G_{opt}\hat{y}_1|^2] + E[|y_2 - G_{opt}\hat{y}_2|^2]. \quad (17)$$

In this example, the MSE in equation (17) may be expanded as follows:

$$\text{MSE} = E[y_1 y_2^* - 2G_{opt}y_1\hat{y}_1^* + G_{opt}^2\hat{y}_1^T\hat{y}_1] + E[y_2 y_2^* - 2G_{opt}y_2\hat{y}_2^* + G_{opt}^2\hat{y}_2^T\hat{y}_2]. \quad (18)$$

By setting the expression in equation (18) to zero the gain for a 2 sub-band architecture may be obtained as follows:

$$\frac{\partial}{\partial G}MSE = \quad (19)$$

$$0 \Rightarrow -2E[y_1\hat{y}_1^*] + 2G_{opt}E[\hat{y}_1^T\hat{y}] - 2E[y_2\hat{y}_2^*] + 2G_{opt}E[\hat{y}_2^T\hat{y}_2] = 0,$$

and therefore $$G = \frac{E[y_1\hat{y}_1^*] + E[y_2\hat{y}_2^*]}{E[\hat{y}_1^T\hat{y}] + E[\hat{y}_2^T\hat{y}_2]}. \quad (20)$$

The expression in equation (20) may be generalized to cases for "i" number of sub-bands as follows:

$$\text{Gain} = \frac{E\langle(\hat{y}[1])^* \cdot (y[1])\rangle + E\langle(\hat{y}[2])^* \cdot (y[2])\rangle + \ldots + E\langle(\hat{y}[j])^* \cdot (y[j])\rangle}{E[\|\hat{y}[1]\|^2] + E[\|\hat{y}[2]\|^2] + \cdots + E[\|\hat{y}[j]\|^2]} \quad (21)$$

where $\hat{y}[n]$ is the echo estimate produced by the filter associated with the n-th frequency sub-band, and y[n] is the sub-band portion of the near-end signal Sin associated with the n-th frequency sub-band.

The filters 520, 522, ..., and 524 may each comprise suitable logic, circuitry, code, and/or interfaces that may be operable to perform linear adaptive filtering of their corresponding sub-band portion of the signal Rout. The filters 520, 522, ..., and 524 may comprise a plurality of taps or filter coefficients that may be adjusted or changed by the adaptation algorithm module 510. In some embodiments of the invention, the filters 520, 522, ..., and 524 may be implemented as a single module having J separate filter sub-modules, for example.

The multiplier 540 may comprise suitable logic, circuitry, code, and/or interfaces that may be operable to scale the values of the coefficients utilized by the filters 520, 522, ..., and 524. The gain G that is applied by the multiplier 540 may be provided by the EVT module 530. The multipliers 550, 552, ..., and 554 may each comprise suitable logic, circuitry, code, and/or interfaces that may be operable to scale the output of their corresponding filter to produce the scaled outputs $G\hat{y}_1, G\hat{y}_2, \ldots,$ and $G\hat{y}_J$. The gain G that is applied by the multipliers 550, 552, ..., and 554 may be provided by the EVT module 530. Moreover, the EVT module 530 may determine which of the multipliers 550, 552, ..., and 554 are to be provided with the gain G when fewer than all of the multipliers 550, 552, ..., and 554 are to scale the outputs of the filters 520, 522, ..., and 524. The multiplier 540 and the multipliers 550, 552, ..., and 554 may be operable to apply a complex-valued gain.

The gains of the multipliers 540, 550, 552, ..., and 554 may be unity (G=1) until the EVT module 530 instructs the multipliers that a new gain is to be applied. In some embodiments of the invention, the functionality of the multipliers 540, 550, 552, ..., and/or 554 may be provided by the EVT module 530. That is, the EVT module 530 may be operable to scale the values of the coefficients utilized by the filters and/or scale the output of the filters.

The analysis module 560 may comprise suitable logic, circuitry, code, and/or interfaces that may be operable to receive the near-end signal Sin and generate J separate sub-band portions of the signal Sin. The subtraction modules 570, 572, ..., and 574 may each comprise suitable logic, circuitry, code, and/or interfaces that may be operable to subtract their corresponding scaled output from their corresponding subband portion of the signal Sin. The synthesis module 580 may comprise suitable logic, circuitry, code, and/or interfaces that may be operable to combine the outputs from the subtraction modules 570, 572, ..., and 574 into the signal Sout.

In operation, the EVT module 530 may detect a change in the echo path that may have resulted from changes in the external volume. The EVT module 530 may compute the gain G by correlating the echo estimates and the corresponding sub-band portions of the signal Sin as shown above in equation (21). The correlation operation may also be utilized to perform the initial detection of an echo path change. The EVT module 530 may validate the gain G before scaling the values of the coefficients utilized by the filters 520, 522, ..., and 524, and/or the output of the filters 520, 522, ..., and 524. Moreover, the EVT module 530 may determine when and how such scaling is to take place.

In another embodiment of the invention, the echo canceller 500 may comprise more than one adaptation algorithm module substantially similar to the adaptation algorithm module 510. For example, there may be one adaptation algorithm module for each of the filters 520, 522, ..., and 524. In another example, there may be multiple adaptation algorithm modules and each of them may be used with a portion of the filters 520, 522, ..., and 524, where such portion may comprise one or more filters. In some instances, when more than one adaptation algorithm module in used in the echo canceller 500, one or more of the adaptation algorithm modules may utilize a different adaptation algorithm than the one utilized by the remaining modules.

Figure 6:
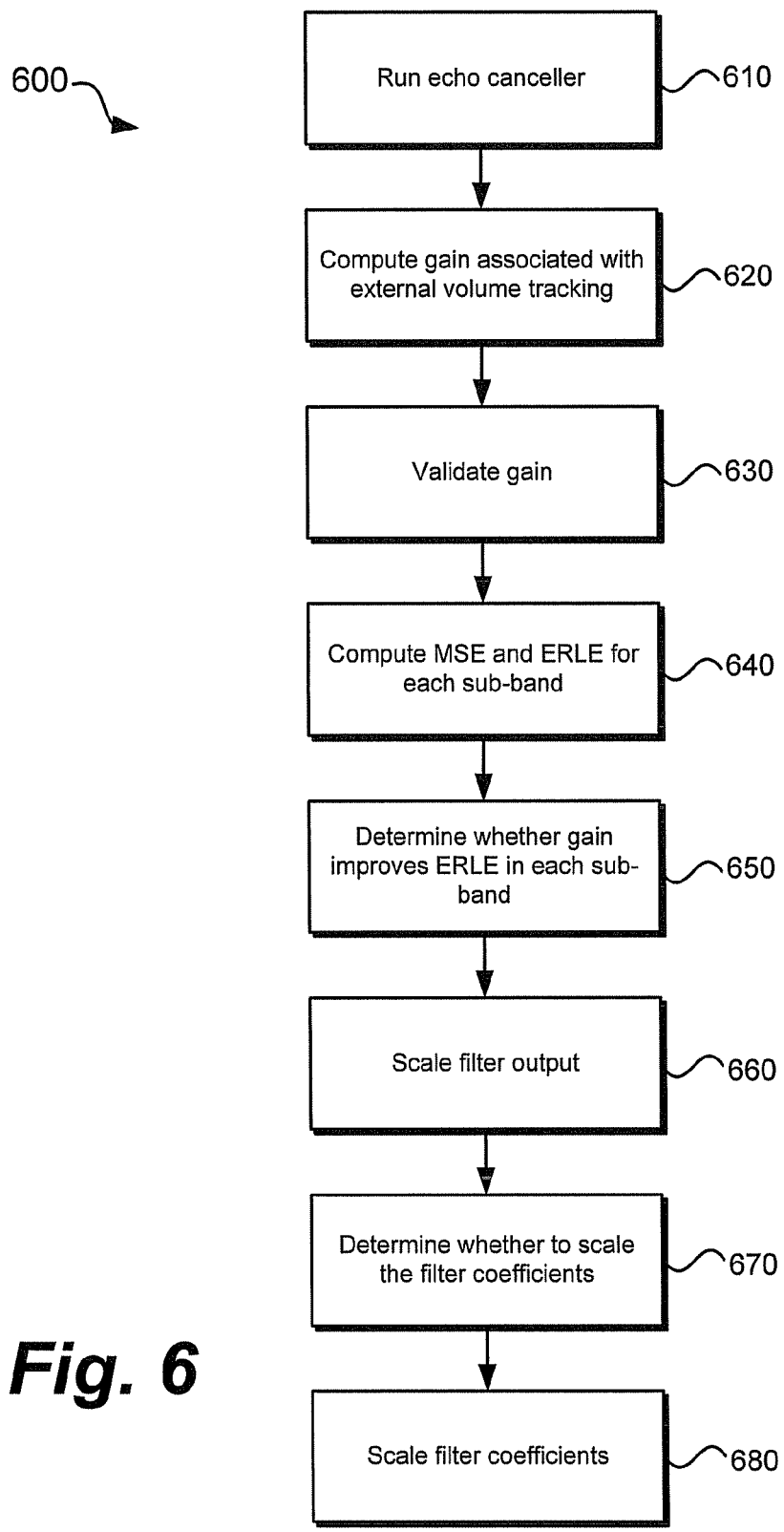
FIG. 6 is a flow chart that illustrates exemplary steps in the operation of an echo canceller to cancel or reduce an echo that results from external volume changes, in accordance with an embodiment of the invention.

FIG. 6 is a flow chart that illustrates exemplary steps in the operation of an echo canceller to cancel or reduce an echo that results from external volume changes, in accordance with an embodiment of the invention. Referring to FIG. 6, there is shown a flow chart 600 in which, at step 610, an echo canceller may be put in operation in a device utilized to communicate a far-end user with a near-end user. The echo canceller may be, for example, the echo canceller module 120, the echo canceller 300, the echo canceller 400, or the echo canceller 500. Operations associated with detection, tracking, modeling, and/or compensation of external volume changes may be enabled at the start of operation of the echo canceller.

At step 620, an EVT module, such as the EVT modules 330 and 530 described above, may compute a gain associated with external volume tracking. The EVT module may be integrated within the echo canceller or may be implemented separately from the echo canceller. At step 630, the EVT module, and/or other modules in the echo canceller, may validate the gain before applying the gain. The validation may comprise determining if the gain is to be discarded because of invalid states of operation. For example, during double talk, the gain computations may be invalid since the near end interference may cause the wrong correlation to be produced for the echo estimate. In another example, when very sudden echo path changes take place, the gain may also be invalid.

At step 640, the EVT module, and/or other modules in the echo canceller, may compute, for each frequency sub-band or for the full band when a full-band architecture is used for the echo canceller, the corresponding MSE, echo return loss enhancement (ERLE), normalized cross-correlation, or other like metric that may be utilized to characterize the echo return. At step 650, the EVT module, and/or other modules in the echo canceller, may determine whether applying the gain to a particular frequency sub-band results in the ERLE, or other equivalent metric, of that frequency sub-band improving significantly, marginally, or getting worse when compared to not applying the gain. At step 660, the output from the filter or filters in the echo canceller may be scaled by having the EVT module apply the computed gain.

At step 670, at least based on the results from step 650, the EVT module, and/or other modules in the echo canceller, may determine whether to scale the coefficients of the filter or filters in the echo canceller. At step 680, based on the determination in step 670, the filter coefficients may be scaled.

Figure 7:
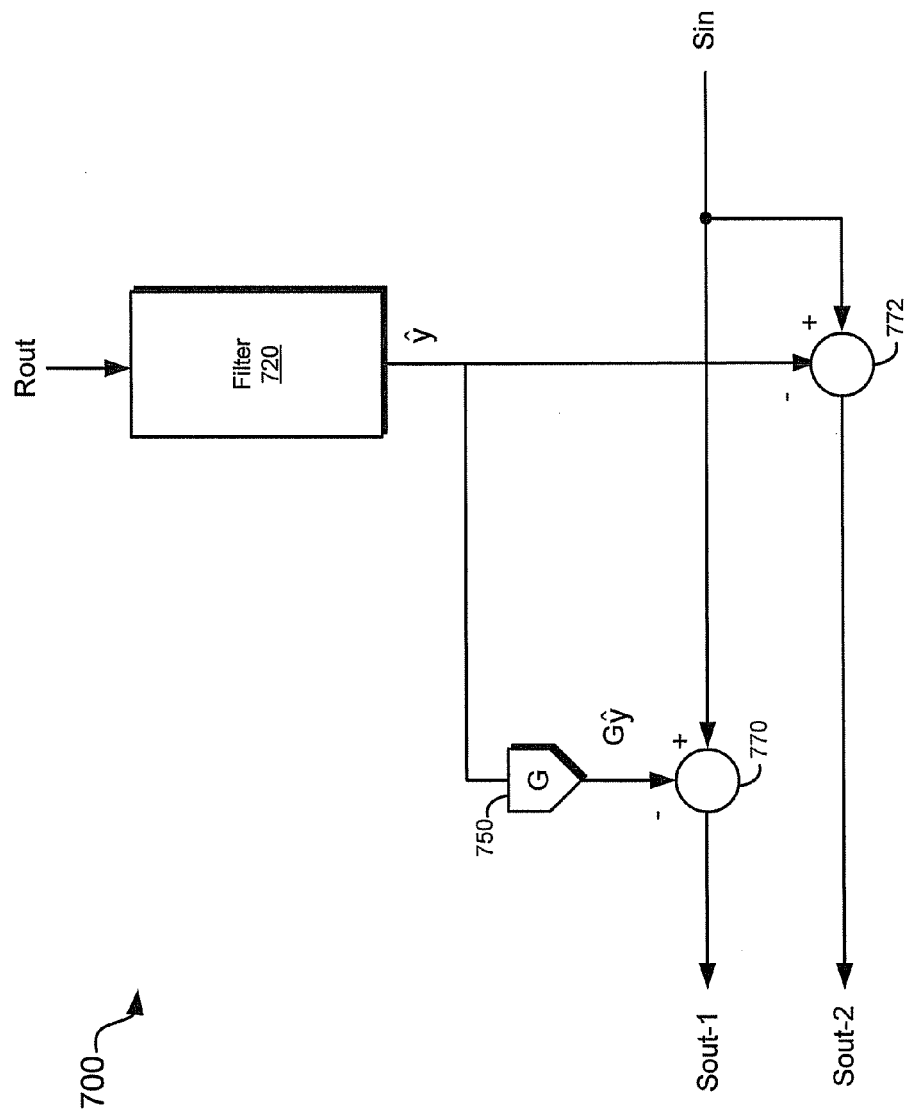
FIG. 7 is a block diagram that illustrates exemplary outputs produced from a filter to determine whether to scale the filter coefficients, in accordance with an embodiment of the invention.

FIG. 7 is a block diagram that illustrates exemplary outputs produced from a filter to determine whether to scale the filter coefficients, in accordance with an embodiment of the invention. Referring to FIG. 7, there is shown a sub-band portion 700 of an echo canceller that may comprise a filter 720, a multiplier 750, and subtraction modules 770 and 772. The filter 720 may be an adaptive filter as described above. The multiplier 750 may have a gain G that may have been set by an EVT module in response to changes in an echo path produced by, for example, a change in an external volume.

In operation, the echo estimate $\hat{y}$ from the filter 720 may be subtracted from the near-end signal Sin at the subtraction module 772 to produce a signal Sout-2. The same echo estimate $\hat{y}$ may be scaled by the multiplier 750 to produce a scaled output $G\hat{y}$, which in turn may be subtracted from the near-end signal Sin at the subtraction module 770 to produce a signal Sout-1. By having two possible outputs, Sout-1 and Sout-2, for each sub-band portion 700 of the echo canceller, the one that provides the higher ERLE, or other equivalent metric, may be selected as the better output.

To determine which output results in the least amount and/or duration of residual echo, the MSE of both outputs may need to be determined. In this regard, the MSE for Sout-2, for which G=1, may be determined utilizing the following expression:

$$\text{MSE}_{G=1} = E[yy^*] + E[\hat{y}\hat{y}^*] - 2Re\{E[y\hat{y}^*]\} \tag{22}$$

where the first term corresponds to the energy of the signal Sin, the second term corresponds to the energy of the echo estimate, and the third term is a cross-correlation of the signal Sin and the echo estimate. When the MSE is computed for a particular frequency sub-band, then the appropriate portion of the signal Sin and the appropriate echo estimate are to be used in equation (22).

The MSE for Sout-1, that is, for the case where $G = G_{opt}$, may be determined based on the expressions for optimal gain described above and on the following expression:

$$\begin{aligned} MSE_{G_{opt}} &\equiv E[\,|y - G_{opt}\hat{y}|^2\,] = E[(y - G_{opt}\hat{y})(y - G_{opt}\hat{y})^*] \\ &= E[yy^*] - G_{opt}^* E[y\hat{y}^*] - G_{opt} E[\hat{y}y^*] + G_{opt} G_{opt}^* E[\hat{y}\hat{y}^*] \\ &= E[yy^*] - G_{opt}^* E[y\hat{y}^*] - (G_{opt}^* E[y\hat{y}^*])^* + G_{opt} G_{opt}^* E[\hat{y}\hat{y}^*] \\ &= E[yy^*] - 2\,\text{Re}\{G_{opt}^* E[y\hat{y}^*]\} + |G_{opt}|^2 E[\hat{y}\hat{y}^*]. \end{aligned} \tag{23}$$

Based on equation (23), the MSE for Sout-1 is given by the following expression:

$$\text{MSE}_{G_{opt}} = E[yy^*] - 2Re\{T_{opt}\}Re\{E[y\hat{y}^*]\} - 2Im\{G_{opt}\}Im\{E[y\hat{y}^*]\} \ldots + [Re\{G_{opt}\}^2 + Im\{G_{opt}\}^2]E[\hat{y}\hat{y}^*] \tag{24}$$

where the first term corresponds to the to the energy of the near-end signal Sin, the last term corresponds to the energy of the echo estimate, the intermediate terms correspond to the cross-correlation of the signal Sin and the echo estimate, and where $G_{opt}$ is an optimal gain for the current iteration as described above in equation (6) for a full-band architecture and equation (21) for a sub-band architecture.

By having the MSE for each of the two possible outputs, the ERLE, or other equivalent metric, may be computed to determine whether applying the gain computed by an EVT module results in improvements or in adverse affects. This determination may be carried out for the full band when a full-band architecture is utilized for the echo canceller or for each frequency sub-band when a sub-band architecture is utilized for the echo canceller. In this regard, the EVT module, and/or other modules in the echo canceller, may keep track for each iteration of the number of frequency sub-bands that may significantly improve residual echo cancellation by using the computed gain, the number that may significantly or marginally improve residual echo cancellation by using the computed gain, the number that may have a worse performance of residual echo cancellation by using the computed gain, and the stability of the gain in the current iteration compared to a previous estimate.

A significant improvement may refer to having improved residual echo removal of higher than 20 percent (%), higher than 30%, higher than 40%, or higher than 50%. A marginal improvement may refer to having improved residual echo removal of less than 10%, less than 15%, less than 20%, between 5-10%, between 5-15%, and between 10-20%. An adverse effect may refer to instances when the use of the computed gain results in a higher residual echo in the output Sout than when the computed gain is not used. A stable gain may occur when the frame-to-frame changes in the gain are less than 4%, less than 5%, less than 6%, or less than 7%.

In the above description, the ERLE is used as a performance metric to determine whether the computed gain improves the echo cancellation. However, it may be possible to solely use the MSE as such a performance metric, without the need to compute the ERLE, and with proper thresholds for comparison. It may also be possible to derive and use other criteria that may be equivalent to either the MSE or to the ERLE, as persons skilled in the art can appreciate.

Figure 8:
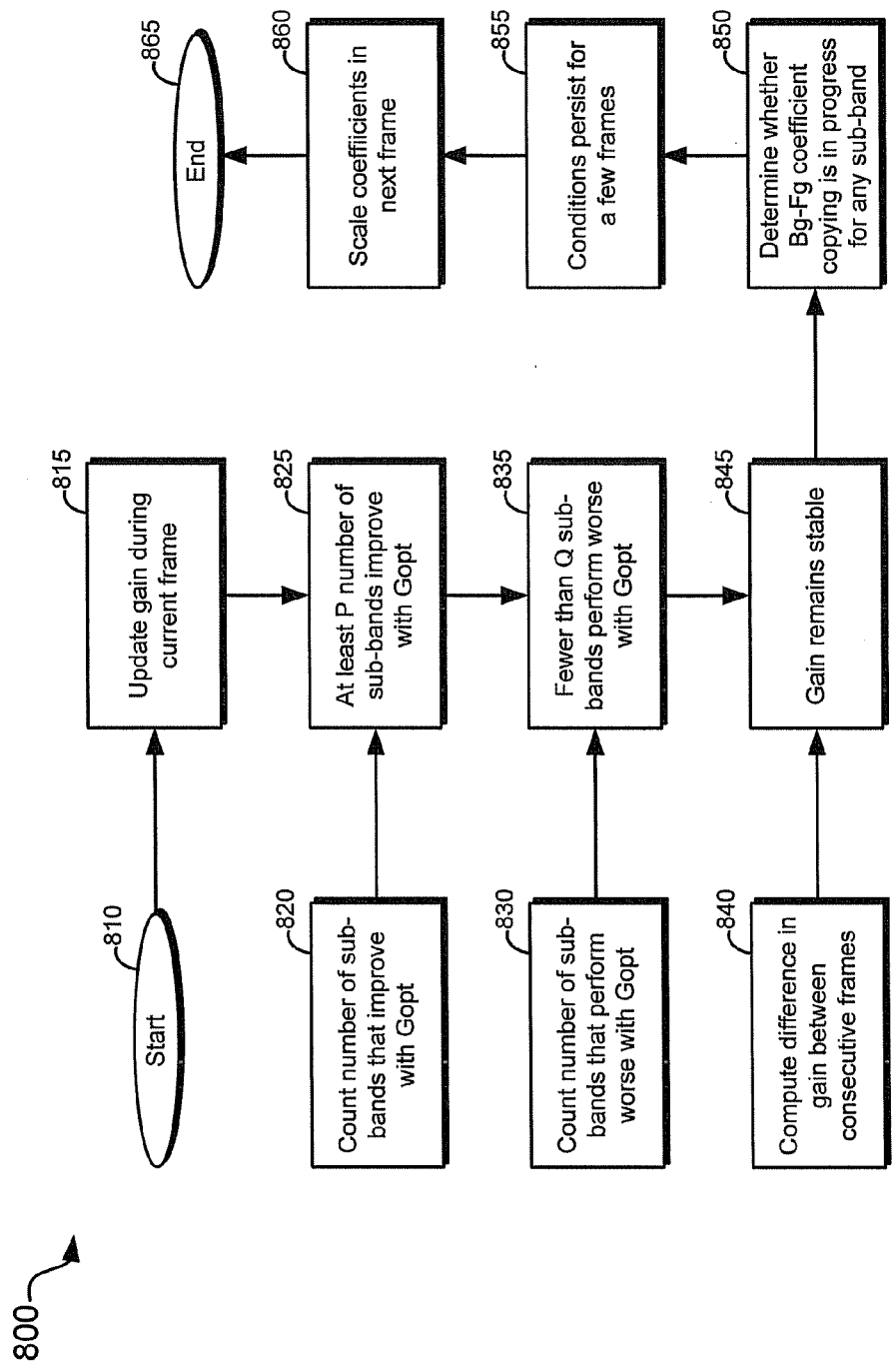
FIG. 8 is a flow chart that illustrates exemplary steps to determine whether to scale the filter coefficients, in accordance with an embodiment of the invention.

FIG. 8 is a flow chart that illustrates exemplary steps to determine whether to scale the filter coefficients, in accordance with an embodiment of the invention. Referring to FIG. 8, there is shown a flow chart 800 in which, at step 815 after start step 810, the gain may be updated for a current iteration by the EVT module. At step 820, the number of frequency sub-bands for which the newly computed Gopt improves the ERLE of the sub-band may be counted. At step 825, when the number counted in step 820 is at least a predetermined number P, the determination of whether to scale the filter coefficients may proceed. The number P may be selected to be half the total number of frequency sub-bands in the echo canceller, for example.

At step 830, the number of frequency sub-bands for which the newly computed Gopt makes the ERLE of the sub-band worse may be counted. At step 835, when that number counted in step 830 is fewer than a predetermined number Q, the determination of whether to scale the filter coefficients may proceed. In some instances, even a single frequency sub-band performing worse may result in the determination being stopped.

At step 840, the difference in the gain computed between consecutive frames may be computed. At step 845, when the difference computed in step 840 is below a certain predetermined percentage value, the determination of whether to scale the filter coefficients may proceed.

At step 850, which may be optional if a two-path echo canceller is not being utilized, it may be determined whether a copying of filter coefficients between a background filter and a foreground filter is taking place. If such copying is taking place, the determination of whether to scale the filter coefficients may not proceed.

At step 855, if the conditions persist for a predetermined number of frames, such as five (5) frames, for example, then the process may proceed to step 860 in which the filter coefficients may be scaled using the gain computed for the current frame. After step 860, the process may proceed to end step 865.

Figure 9:
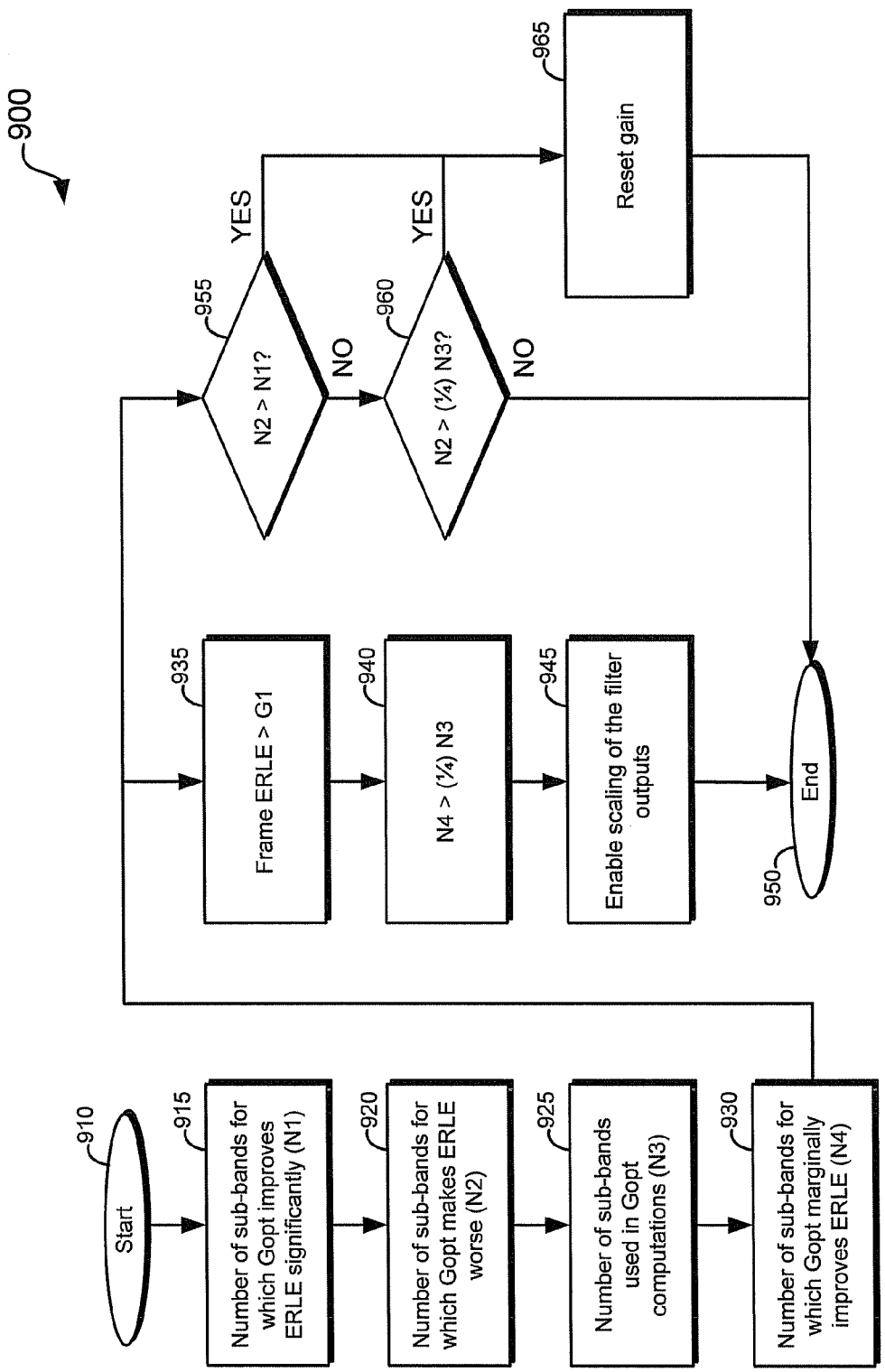
FIG. 9 is a flow chart that illustrates exemplary steps to validate the computed gain and to determine whether to enable the scaling of the filter outputs, in accordance with an embodiment of the invention.

FIG. 9 is a flow chart that illustrates exemplary steps to validate the computed gain and to determine whether to enable the scaling of the filter outputs, in accordance with an embodiment of the invention. Referring to FIG. 9, there is shown a flow chart 900 that illustrates various checks that are utilized to ensure that the gain is valid before it is applied. Moreover, these checks may also be utilized to decide whether the computed gain has diverged and it may be necessary to reset the adaptation process.

After start step 910, at step 915, the number (N1) of frequency sub-bands for which $G_{opt}$ improves ERLE significantly may be counted. At step 920, the number (N2) of frequency sub-bands for which $G_{opt}$ makes ERLE worse may be counted. At step 925, the total number (N3) of frequency sub-bands used in the $G_{opt}$ computations may be counted. At 930, the number (N4) of frequency sub-bands for which $G_{opt}$ improves ERLE marginally may be counted.

At step 935, a full-band ERLE may be computed and compared to a threshold to make sure that it is high enough. The full-band ERLE may be determined based on the MSE. For example, by combining equations (6) and (24) above, the full-band MSE may be obtained as follows:

$$MSE_{Gopt} = E[yy^*] - \frac{E[y\hat{y}^*]}{E[\hat{y}\hat{y}^*]}E[\hat{y}y^*] - \frac{(E[y\hat{y}^*])^*}{E[\hat{y}\hat{y}^*]}E[y\hat{y}^*] + \left|\frac{E[y\hat{y}^*]}{E[\hat{y}\hat{y}^*]}\right|^2 E[\hat{y}\hat{y}^*] \quad (25)$$

$$= E[yy^*] - \frac{E[y\hat{y}^*]}{E[\hat{y}\hat{y}^*]}E[\hat{y}y^*] - \frac{|E[y\hat{y}^*]|^2}{E[\hat{y}\hat{y}^*]} + \frac{|E[y\hat{y}^*]|^*}{E[\hat{y}\hat{y}^*]},$$

and therefore $$MSE_{Gopt} = E[yy^*] - G_{opt}(E[y\hat{y}^*])^*. \quad (26)$$

Once the full-band MSE is known, the full-band ERLE may be determined using the expression presented below:

$$ERLE_{Gopt} = \frac{E[\|Sin\|^2]}{E[\|Sin\|^2] - (G_{Opt})(\text{Full band cross correlation})}, \quad (27)$$

where the numerator is the full-band energy and the denominator is the full-band MSE. When the full-band ERLE is higher than a value G1, the validation process may proceed. It may also be possible to use the full-band MSE, that is, equation (26) or the denominator of equation (27), as the performance criterion for use in step 935 without need to compute the full-band ERLE. It may also be possible to derive and use other performance criteria that may be equivalent to the above-described ERLE such as, for example, the normalized cross-correlation between the estimated echo and the near-end signal, or other measures, as persons skilled in the art can appreciate.

At step 940, the number of marginally improved frequency sub-bands may be required to meet a certain threshold. In this instance, when N4 is greater than (1/4)·N3, the validation process may proceed. At step 945, the gain may be validated and the scaling of the filter outputs may be enabled. After step 945, the process may proceed to end step 950. In a subband architecture, such as the one described in FIG. 5, for example, when the scaling of the filter outputs is enabled, the decision to actually scale the output of the filter in a given band may be based on whether the ERLE, or an equivalent metric, improves by carrying out such scaling, as described above. Therefore, in a given iteration, some of the filter outputs may be scaled while others may not.

At step 955, when N2 is greater than N1, that is, when the number of frequency sub-bands that performed worse is greater than those that improved significantly, the gain may be deemed to have diverged and the process may proceed to step 965 where the gain may be reset. Otherwise, the process may proceed to step 960.

At step 960, when the number of frequency sub-bands that performed worse is greater than a certain number of the total frequency sub-bands used in the $G_{opt}$ computations, the gain may also be deemed to have diverged and the process may proceed to step 965 where the gain may be reset. In this instance, when N2 is greater than (1/4)·N3, the gain may be reset at step 965. After steps 960 and 965, the process may proceed to end step 950.

The various thresholds, parameters, and/or values that are used in the comparisons presented in the steps of FIG. 9 are provided by way of illustration and not of limitation. Other thresholds, parameters and/or values may be utilized in a substantially similar manner to validate the gain and/or determine whether the gain has diverged and needs to be reset.

Aspects of the invention may provide for a device, such as the devices 101, 102, and 103 in FIGS. 1A-1C or the echo canceller modules described herein, for example, which may comprise a filter, such as the filter 320 in FIG. 3, for example. The device or the echo canceller module may be operable to compute a gain based on an echo estimate produced by the filter and on a near-end signal comprising audio information. The computed gain may be a complex-valued gain. The device or echo canceller module may validate the gain and may adjust the echo estimate based on the gain when the gain is valid. The computed gain may be deemed valid when an echo return metric for a current frame is above or below a given threshold value, whichever is appropriate for that metric. The echo return metric may be ERLE, MSE, NC, or an equivalent metric. The device or echo canceller module may generate a signal, such as the signal Sout, for example, based on the adjusted echo estimate and the near-end signal.

The device or echo canceller module may adjust the echo estimate by first applying the computed gain to an output of the filter and subsequently scaling a value of each of the coefficients of the filter based on the computed gain. The device or the echo canceller module may compute the gain for a current frame based on the computed gain for a previous frame and on an adaptation parameter. The device or the echo canceller module may compute the gain based on a correlation of the echo estimate produced by the filter and the near-end signal.

The filter used for echo cancellation in the device or the echo canceller module may be a foreground filter, such as the foreground filter 460 in FIG. 4, for example. The device or echo canceller module may also comprise a background filter, such as the background filter 420 in FIG. 4, for example. In such instances, the device or echo canceller module 120 may replace a value of each of the coefficients of the foreground filter with the value of the corresponding coefficient of the background filter and may adjust the echo estimate by scaling a value of each of the coefficients of the foreground filter based on the computed gain.

The filter used for echo cancellation in the device or the echo canceller module may comprise or may be implemented utilizing a plurality of filters, such as the filters 520, 522, . . . , and 524 in FIG. 5, for example. Each of the plurality of filters may produce an echo estimate associated with a different frequency sub-band. In such instances, the device or echo canceller module may compute the gain based on the echo estimates produced by the plurality of filters and on corresponding sub-band portions of the near-end signal. Moreover, the device or echo canceller module may adjust the echo estimates by first applying the computed gain to an output of some or all of the plurality of filters, based on performance-based criteria, and subsequently scaling a value of each of the coefficients of some or all of the plurality of filters based on the computed gain. The device or echo canceller module may also combine the echo estimates from the plurality of filters to produce the adjusted echo estimate.

For each of the plurality of filters, the device or echo canceller module may determine whether to apply the computed gain to an output of the filter. The device or the echo canceller module may also determine whether to adjust the echo estimates by scaling a value of each of the coefficients of the plurality of filters based on the computed gain when the number of filters for which it was determined to apply the computed gain to the output of the filter is above a threshold number. The device or the echo canceller module may be operable to reset the computed gain to a default value when the number of filters for which it was determined to apply the computed gain to the output of the filter is lower than the number of filters for which it was determined not to apply the computed gain to the output of the filter.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for modeling external volume changes within an acoustic echo canceller.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A computer-implemented method, comprising:
    computing a gain based on an echo estimate produced by a filter and on a near-end signal comprising audio information;
    adjusting the echo estimate based on the computed gain;
    generating a signal based on the adjusted echo estimate and the near-end signal; and
    adjusting the echo estimate by first applying the computed gain to an output of the filter and subsequently scaling a value of each coefficient of the filter based on the computed gain.

2. The method of claim 1, comprising computing the gain for a current frame based on the computed gain for a previous frame and on an adaptation parameter.

3. The method of claim 1, wherein the filter is a foreground filter and further comprising:
    replacing a value of each of the coefficients of the foreground filter with a value of a corresponding coefficient of a background filter; and
    adjusting the echo estimate by scaling the value of each of the coefficients of the foreground filter based on the computed gain.

4. The method of claim 1, wherein the filter comprises a plurality of filters, each of which produces an echo estimate associated with a different frequency sub-band, the method comprising:
    computing the gain based on the echo estimates produced by the plurality of filters and on corresponding sub-band portions of the near-end signal;
    adjusting the echo estimates by first applying the computed gain to an output of some or all of the plurality of filters in accordance with a performance-based criteria, and subsequently scaling a value of each of the coefficients of the filters, the scaling being based on the computed gain; and
    combining the echo estimates from the plurality of filters to produce the adjusted echo estimate.

5. The method of claim 4, wherein the performance-based criteria utilized to adjust the echo estimates is based on a comparison between:
    an estimated echo return loss enhancement (ERLE) value, an mean square error (MSE) value, or a metric value that is equivalent to the ERLE value or the MSE value, which results when the computed gain is applied; and
    the corresponding value when the computed gain is not applied.

6. The method of claim 1, wherein the filter comprises a plurality of filters, each of which produces an echo estimate associated with a different frequency sub-band, the method comprising:
    computing the gain based on the echo estimates produced by the plurality of filters and on corresponding sub-band portions of the near-end signal;
    for each of the plurality of filters, determining whether to apply the computed gain to an output of the filter; and
    determining whether to adjust the echo estimates by scaling a value of each of the coefficients of the plurality of filters based on the computed gain when a number of filters for which it was determined to apply the computed gain to the output of the filter is above a threshold number.

7. The method of claim 6, comprising resetting the computed gain to a default value when the number of filters for which it was determined to apply the computed gain to the output of the filter is lower than the number of filters for which it was determined not to apply the computed gain to the output of the filter.

8. The method of claim 1, comprising validating the computed gain, wherein the computed gain is valid when an echo return metric for a current frame is above or below a corresponding threshold value, whichever is appropriate for a particular echo return metric.

9. The method of claim 8, wherein the echo return metric for the current frame is an echo return loss enhancement (ERLE) value, a mean square error (MSE) value, a normalized cross-correlation, or a metric that is equivalent to the (ERLE) value, the (MSE) value, or the normalized cross-correlation.

10. A system, comprising one or more hardware processors, one or more circuits, or any combination thereof comprising a foreground filter and a background filter, the one or more hardware processors, one or more circuits, or any combination thereof, being operable to:
    compute a gain based on an echo estimate produced by the foreground filter and on a near-end signal comprising audio information;
    adjust the echo estimate based on the computed gain;
    generate a signal based on the adjusted echo estimate and the near-end signal;
    replace a value of a coefficient of the foreground filter with a value of a corresponding coefficient of the background filter; and
    adjust the echo estimate by scaling the value of the coefficient of the foreground filter based on the computed gain.

11. The system of claim 10, wherein the one or more hardware processors, one or more circuits, or any combination thereof are operable to adjust the echo estimate by first applying the computed gain to an output of the foreground filter and subsequently scaling a value of each coefficient of the foreground filter based on the computed gain.

12. The system of claim 10, wherein the one or more hardware processors, one or more circuits, or any combination thereof are operable to compute the gain for a current frame based on the computed gain for a previous frame and on an adaptation parameter.

13. The system of claim 10, wherein the foreground filter comprises a plurality of foreground filters, individual ones of which produce an echo estimate associated with a different frequency sub-band; and the one or more hardware processors, one or more circuits, or any combination thereof are further operable to:

compute the gain based on the echo estimates produced by the plurality of filters and on corresponding sub-band portions of the near-end signal;

adjust the echo estimates by first applying the computed gain to an output of some or all of the plurality of foreground filters in accordance with a performance-based criteria, and subsequently scale a value of individual ones of the coefficients of the plurality of foreground filters, the scaling being based on the computed gain; and combine the echo estimates from the plurality of foreground filters to produce the adjusted echo estimate.

14. The system of claim 13, wherein the performance-based criteria utilized to adjust the echo estimates is based on a comparison between:

an echo return loss enhancement (ERLE) value, a mean square error (MSE) value, or a metric value that is equivalent to the ERLE value or the MSE value, which results when the computed gain is applied; and the corresponding value when the computed gain is not applied.

15. The system of claim 10, wherein the foreground filter comprises a plurality of foreground filters, individual ones of which produces an echo estimate associated with a different frequency sub-band; and the one or more hardware processors, one or more circuits, or any combination thereof are further operable to:

compute the gain based on the echo estimates produced by the plurality of foreground filters and on corresponding sub-band portions of the near-end signal;

for individual ones of the plurality of foreground filters, determine whether to apply the computed gain to an output of the individual foreground filter; and determine whether to adjust the echo estimates by scaling a value of individual ones of the coefficients of the plurality of foreground filters based on the computed gain when a number of foreground filters for which it was determined to apply the computed gain to the output of the individual foreground filter is above a threshold number.

16. The system of claim 15, wherein the one or more hardware processors, one or more circuits, or any combination thereof are further operable to reset the computed gain to a default value when the number of foreground filters for which it was determined to apply the computed gain to the output of the individual foreground filter is lower than the number of foreground filters for which it was determined not to apply the computed gain to the output of the individual foreground filter.

17. The system of claim 10, wherein the one or more hardware processors, one or more circuits, or any combination thereof are operable to validate the computed gain; and the computed gain is valid when an echo return metric for a current frame is above or below a given threshold value, whichever is appropriate for a particular echo return metric.

18. The system of claim 17, wherein the echo return metric for the current frame is an echo return loss enhancement (ERLE) value, a mean square error (MSE) value, a normalized cross-correlation, or a metric that is equivalent to the (ERLE) value, the (MSE) value, or the normalized cross-correlation.

19. A non-transitory computer readable medium having a program that, when executed by processing circuitry, causes the processing circuitry to:

compute a gain based on an echo estimate produced by a filter and on a near-end signal comprising audio information;

adjust the echo estimate based on the computed gain;

generate a signal based on the adjusted echo estimate and the near-end signal; and adjust the echo estimate by first applying the computed gain to an output of the filter and subsequently scaling a value of each coefficient of the filter based on the computed gain.

20. The non-transitory computer readable medium of claim 19, wherein the program, when executed by the processing circuitry, further causes the processing circuitry to compute the gain for a current frame based on the computed gain for a previous frame and on an adaptation parameter.

* * * * *